P. A. LEWIS & H. N. FAAS.
SINGLE DISK FURROW OPENER.
APPLICATION FILED MAR. 30, 1914.
1,114,156.
Patented Oct. 20, 1914.
2 SHEETS—SHEET 1.
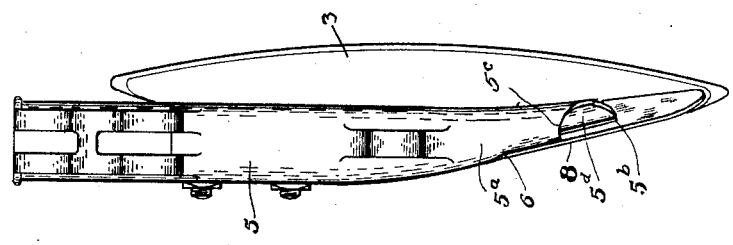
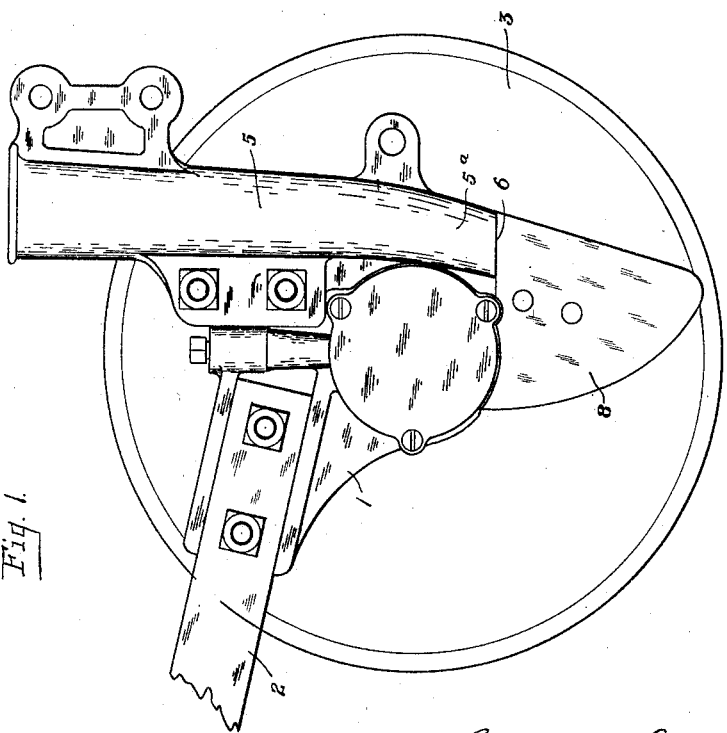

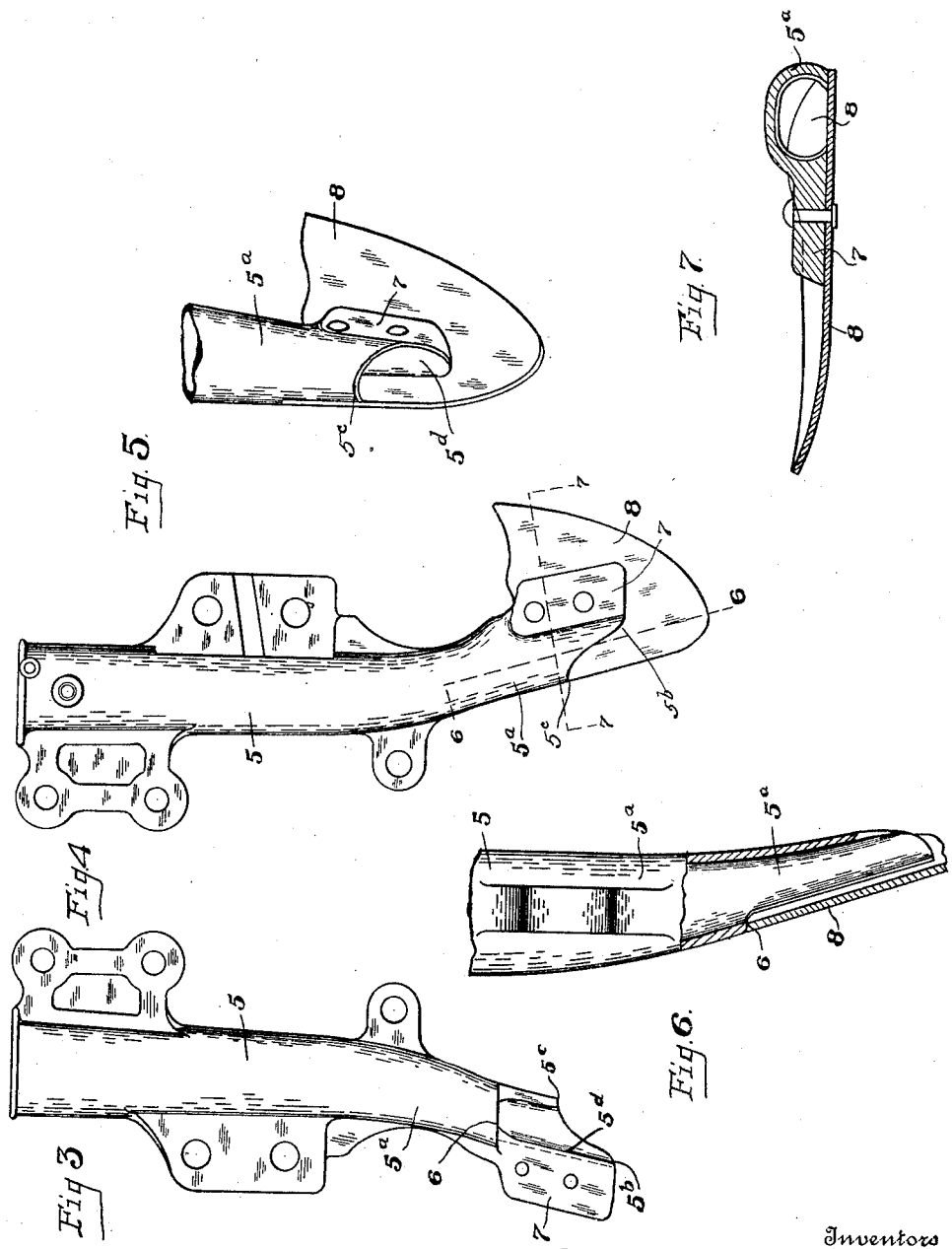

UNITED STATES PATENT OFFICE.

PEARL A. LEWIS AND HENRY N. FAAS, OF SPRINGFIELD, OHIO, ASSIGNORS TO THE AMERICAN SEEDING MACHINE COMPANY, OF SPRINGFIELD, OHIO, A CORPORATION OF OHIO.

SINGLE-DISK FURROW-OPENER.

1,114,156.      Specification of Letters Patent.      Patented Oct. 20, 1914.

Application filed March 30, 1914. Serial No. 828,267.

*To all whom it may concern:*

Be it known that we, PEARL A. LEWIS and HENRY N. FAAS, citizens of the United States, residing at Springfield, in the county of Clark and State of Ohio, have invented certain new and useful Improvements in Single-Disk Furrow-Openers, of which the following is a specification.

Our invention relates to improvements in disk furrow openers for seeding machines, and particularly to a furrow opener especially designed for the sowing of small seed such as alfalfa, clover, and other small seed of that character.

The object of the invention is to provide a furrow opener of the type referred to which will be simple in construction and effective in its operation of opening a comparatively small furrow and properly depositing small seed therein.

In the accompanying drawings,—Figure 1 is a side elevation of a furrow opener embodying our improvements. Fig. 2 is a rear view of the same. Fig. 3 is a view of the outside of the boot with the shield and other parts of the furrow opener detached. Fig. 4 is a view of the inside of the boot with the shield attached thereto. Fig. 5 is a perspective view of the lower portion of the boot and shield. Fig. 6 is a rear view of the lower portion of the boot and shield, partly broken away and shown in section, the section being on the line 6—6 of Fig. 4. Fig. 7 is a transverse section through the lower part of the boot and shield, the section being on the line 7—7 of Fig. 4.

Like parts are represented by similar characters of reference in the several views.

In the said drawings, 1 represents the frame portion of the furrow opener, secured at the rear end of the usual drag-bar 2 and having rotatably mounted thereon a concavo-convex disk 3, arranged at an angle to the line of draft and to a vertical plane in the usual way. Secured to the rear portion of the support is a boot 5, the upper portion of which is formed in the usual way to receive the seed from the distributing devices, but the lower portion of which is constructed in a peculiar manner as will now be described.

Beginning with approximately the center of the boot, the same is converged or narrowed toward the point of discharge and is curved inwardly (see Fig. 2) so that the lower portion $5^a$ thereof will lie in close proximity to the convex face of the disk, the boot terminating at a point some distance above the cutting edge of the disk. The outside wall of the boot is cut away from the point indicated by 6, to the extreme lower end $5^b$, and at the lower end thereof the forward wall of the boot has a projecting ear or lug 7 to which is secured, preferably by riveting, a shield 8, the rear portion of the shield being extended across the cut-away portion of the boot, with the rear edge of the shield lying substantially coincident with the rear wall of the boot; the cutting away of the wall of the boot enabling the shield to be placed closer to the face of the disk, the shield forming in effect a continuation of the outer wall of the boot. The shield projects below the lower end of the boot to a point close to the cutting edge of the disk and the lower portion of the shield and the front edge thereof are bent inwardly toward the convex face of the disk so that the lower point and the front edge thereof will lie close to the convex face of the disk and form with said disk a gradually narrowing passage-way forming in effect a continuation of the passage-way through the boot, which passageway will be substantially inclosed at its lower end and at its forward side but open at the rear as shown best in Fig. 2. The entire rear wall of the boot is also cut away, beginning at the point $5^c$, and a portion of the inner wall is also cut away on a forwardly and downwardly curved line beginning at the point $5^c$ and extending to the extreme lower end $5^b$ of the boot.

It will be understood that this furrow opener, being especially designed for the sowing of grass-seed and the like, where the furrow openers are spaced close together, is comparatively small, and that, owing to the fact that the trench which it makes must be shallow, the disk is set at but a slight angle to the line of draft. Consequently, as the lower end of the boot and the shield should be within the furrow formed by the disk, it is necessary that the boot must be of small dimensions, so much so that if the boot was continued to the point of discharge, the discharge opening would be so small as to readily clog up and obstruct the passage of the seed. By terminating the conduit proper well above the lower edge of the disk, and by cutting away the rear and inner walls thereof, it will be noticed that we are enabled to have the entirely closed part of the conduit formed with a much larger discharge opening than if the conduit proper was continued down to the point of discharge and narrowed to the amount necessary to permit it to lie within the narrow furrow formed by the disk. Also, by continuing the shield downwardly and inwardly, the seed will be protected against trash and the earth from the land side of the furrow, until it has been properly deposited in the trench. Further, it will be noticed that the front wall of the lower end of the boot extends down between the shield and the disk, and that this front wall, owing to the curvature of the boot, constitutes a trough-shaped or grooved guide 5ᵈ to direct the course of the seed after it leaves the closed portion of the conduit and cause it to be deflected in the proper direction between the lower end of the shield and the disk.

Having thus described our invention, we claim:

1. In a disk furrow opener, a support, a disk rotatably mounted upon said support, a boot secured to said support at the side of said disk, the lower end of said boot terminating at a point above the cutting edge of said disk and having the extreme lower end cut away at the rear and on the inner side, and a shield rigidly secured to the outer side of said boot and extending below the same and also extending rearwardly to a point substantially coincident with the rear wall of said boot, said shield having its forward and lower edges bent inwardly in close proximity to the side of said disk.

2. In a disk furrow opener, a support, a disk rotatably mounted upon said support, a boot secured to said support at the side of said disk, the lower end of said boot terminating at a point above the cutting edge of said disk and having the extreme lower end cut away at the rear and also on both sides, and a shield secured to the outer side of said boot so as to close the outer cut-away portion thereof, said shield being extended below said boot to a point in close proximity to the cutting edge of the disk and also being bent so as to cause its forward and lower edges to lie in close proximity to the side of said disk, the forward wall of said boot being extended and formed of a trough shape, substantially as and for the purpose specified.

3. In a disk furrow opener, a support, an angularly-arranged concavo-convex disk rotatably mounted upon said support, a boot secured to said support at the side of said disk, said boot being converged or narrowed toward the point of discharge with its lower end curving inwardly so as to lie in close proximity to the convex side of said disk, the lower end of said boot terminating at a point above the cutting edge of said disk and having the extreme lower end cut away at the rear and at both sides, a shield secured to the outer side of said boot so as to close the outer open side thereof, said shield being projected below said boot to a point in close proximity to the cutting edge of said disk and having its lower and forward edges bent inwardly in close proximity to the convex side of said disk, the forward wall of said boot at the extreme lower end thereof being formed of a trough shape, substantially as and for the purpose specified.

In testimony whereof, we have hereunto set our hands this 20th day of March, 1914.

PEARL A. LEWIS.
HENRY N. FAAS.

Witnesses:
CHAS. I. WELCH,
LADRU E. COLLIER.

---

Copies of this patent may be obtained for five cents each, by addressing the "Commissioner of Patents, Washington, D. C."